United States Patent [19]

Chouinard, Jr.

[11] Patent Number: 5,680,878

[45] Date of Patent: Oct. 28, 1997

[54] CONTROL VALVE RESPONSE MEASUREMENT DEVICE

[75] Inventor: Lawrence J. Chouinard, Jr., Gladstone, Mich.

[73] Assignee: The Mead Corporation

[21] Appl. No.: 569,924

[22] Filed: Dec. 8, 1995

[51] Int. Cl.$^6$ ............................................. F16K 37/00
[52] U.S. Cl. ........................ 137/1; 137/554; 116/277; 251/129.04
[58] Field of Search ...................... 137/1, 554; 116/277; 251/129.04

[56] References Cited

U.S. PATENT DOCUMENTS

| | | | |
|---|---|---|---|
| 2,313,011 | 3/1943 | Duwe | 264/17 |
| 2,558,517 | 6/1951 | Handelman | 116/277 X |
| 2,700,363 | 1/1955 | Waskiw | 116/277 |
| 2,802,483 | 8/1957 | Davis | 137/554 X |
| 3,007,489 | 11/1961 | Biddle | 137/554 |
| 3,363,601 | 1/1968 | Mills, III | 116/277 |
| 4,690,168 | 9/1987 | Kihm | 137/554 |
| 4,721,131 | 1/1988 | Ciordinik et al. | 137/554 |
| 4,805,665 | 2/1989 | League | 116/277 X |
| 4,899,602 | 2/1990 | Fender | 73/865.9 |
| 5,009,075 | 4/1991 | Okoren | 62/127 |
| 5,099,867 | 3/1992 | Emery | 137/554 X |
| 5,115,672 | 5/1992 | McShane et al. | 73/596 |
| 5,154,080 | 10/1992 | Hill et al. | 73/597 |
| 5,193,568 | 3/1993 | Eissenberg et al. | 137/1 |
| 5,232,198 | 8/1993 | Boyles et al. | 137/554 X |

*Primary Examiner*—John Rivell
*Attorney, Agent, or Firm*—Thompson Hine & Flory LLP

[57] ABSTRACT

A method and apparatus employs a measurement device placed on an automatic control valve to test the speed of response of the control valve and any lost motion created by or within any mechanical linkage or connection used to automatically actuate the valve. A chain link clamp is attached between the valve shaft and a device for measuring the movement of the valve stem of the control valve to provide positive movement indication.

11 Claims, 3 Drawing Sheets

CONTROL VALVE RESPONSE MEASUREMENT DEVICE

BACKGROUND OF THE INVENTION

The present invention relates to a measurement device which is placed on an automatic control valve to test the speed of response of the control valve and any lost motion created by or within any mechanical linkage or connection used to automatically actuate the valve. More particularly, this invention relates to a chain link clamp device for measuring the movement of the valve stem of the control valve and the method of measuring the movement using such a device.

Typically, automatic control valves must be tested with measurement devices for their accuracy and speed of response to an electrical actuation signal. The control valve should respond to the small signals with a change in flow. The industry standards permit a 1% tolerance in total valve movement. However, typical measurement devices involve extensions and couplings which unfortunately can result in inaccurate readings which can vary by more than the 1% tolerance permitted by industry standards.

Further, control valves are prone to backlash and stiction. Backlash is the play in the valve which must be taken up before the valve will move. Stiction is the resistance of the valve to movement. This is sometimes caused by packing, which makes the valve stick so that a larger signal is needed in order to get the valve to break loose and move. These two situations can cause up to 5% lost motion in the valve stem which is highly undesirable.

Accordingly, there is a need for a measuring device which can be attached to a valve to measure valve response which is both quick and easy to install and assemble and assists in detecting lost motion. Further, there is a need for a nondestructive and noninvasive method and device for measuring valve movement, measuring speed of response and measuring any lost motion.

SUMMARY OF THE INVENTION

The present invention is a control valve response measuring device to test automatic valve response. In a preferred embodiment of the invention, the measuring device includes a chain clamp which hooks securely onto a valve stem member such as a handle mounted on the valve stem or onto the valve stem itself. The control valve response measurement device for detecting movement of a valve stem of the present invention comprises a threaded shaft; a main body threadably received on the threaded shaft; an end block which is preferably V-shaped and is attached to an end of the threaded shaft; a hook on the body; and a chain having a length such that the chain is capable of being clamped around a periphery of a valve stem and hooked onto the hook on the main body, wherein upon turning the threaded shaft, the hook carrying block is displaced from the end block and the chain tightens around the valve stem member.

The measurement device further includes a linkage in the form of a wire clamp, which links the chain clamp described above to a linear detection device via a wire cable. The detection device then sends a signal to a computer or charting device so that the measured response from the device can be compared to the signal input from the actuator.

Accordingly, it is an object of the present invention to provide a control valve response measurement device which is easier to operate than known systems; a system which is accurate; a system which can be placed on a valve while the system loop is running without disrupting the process.

It is a further object of the invention to provide a method of measuring movement of an actuator valve comprising the steps of providing a measuring device having a threaded shaft, a body threadably received on the threaded shaft, an end block having a shaped opening, the end block being attached to the end of the threaded shaft, a hook on the main body, and a chain; providing a valve stem member of a control valve; clamping the chain around a periphery of the valve stem member; hooking the chain on the hook; and turning the threaded shaft in order to displace the body with respect to the end block and thereby tightening the chain around the valve stem and detecting a signal.

Other objects and advantages of the present invention will be apparent from the following description, the accompanying drawings and the appended claims.

DETAILED DESCRIPTION

The response measuring device of the present invention is attached to a valve stem member of a control valve as a simple and accurate means to test automatic valve response while the control valve is in the process line and the system is in operation. In accordance with the invention, one can determine speed of response of the valve as well as any lost motion created by or within other mechanical mechanisms used to drive the valve in response to an electrical valve actuation signal. Further, this device is accurate to approximately 0.1% of total valve movement, which is well within the industry standards.

Figure 1:
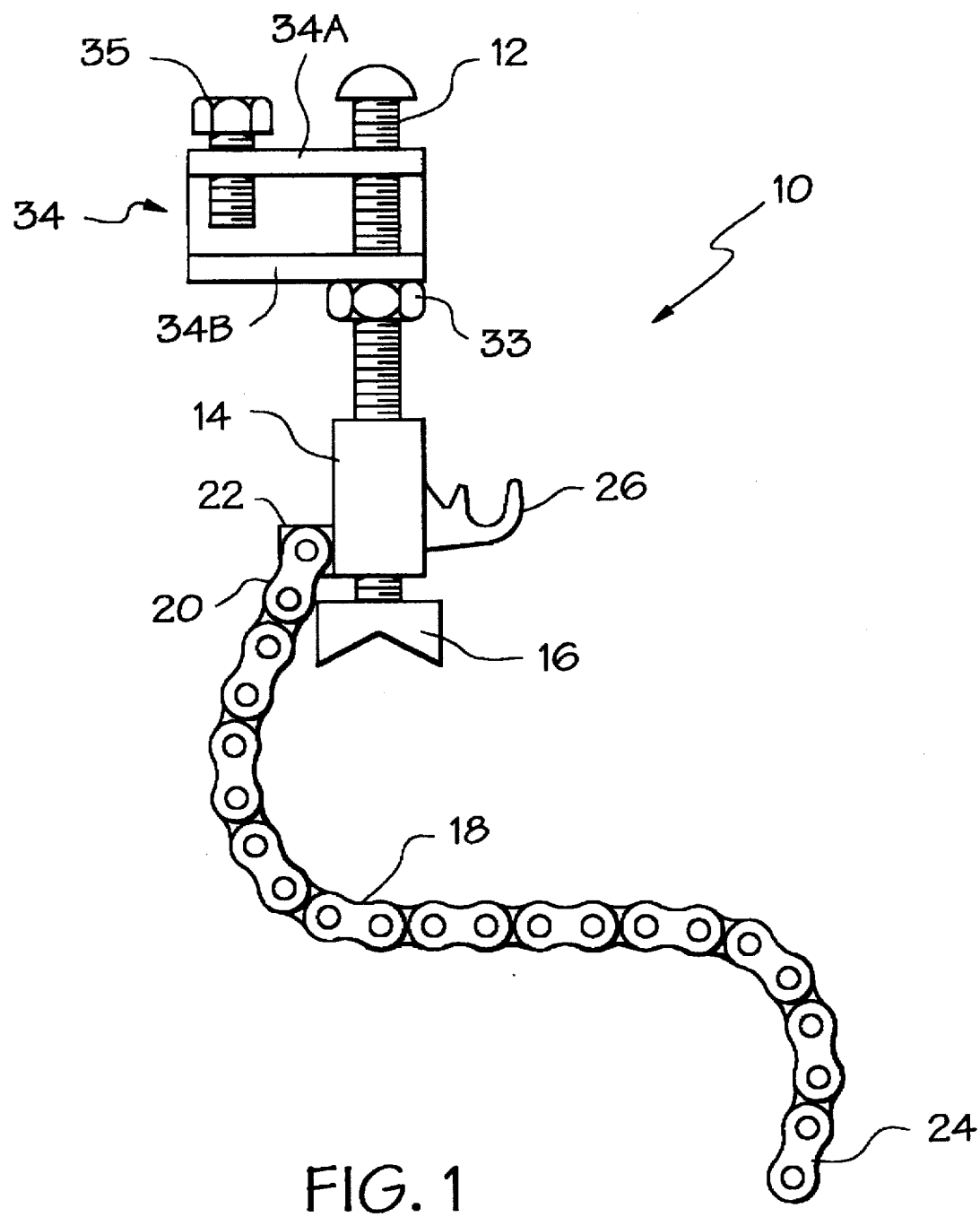
FIG. 1 is a front elevational view, of the control valve response measurement device of the present invention.
Figure 2:
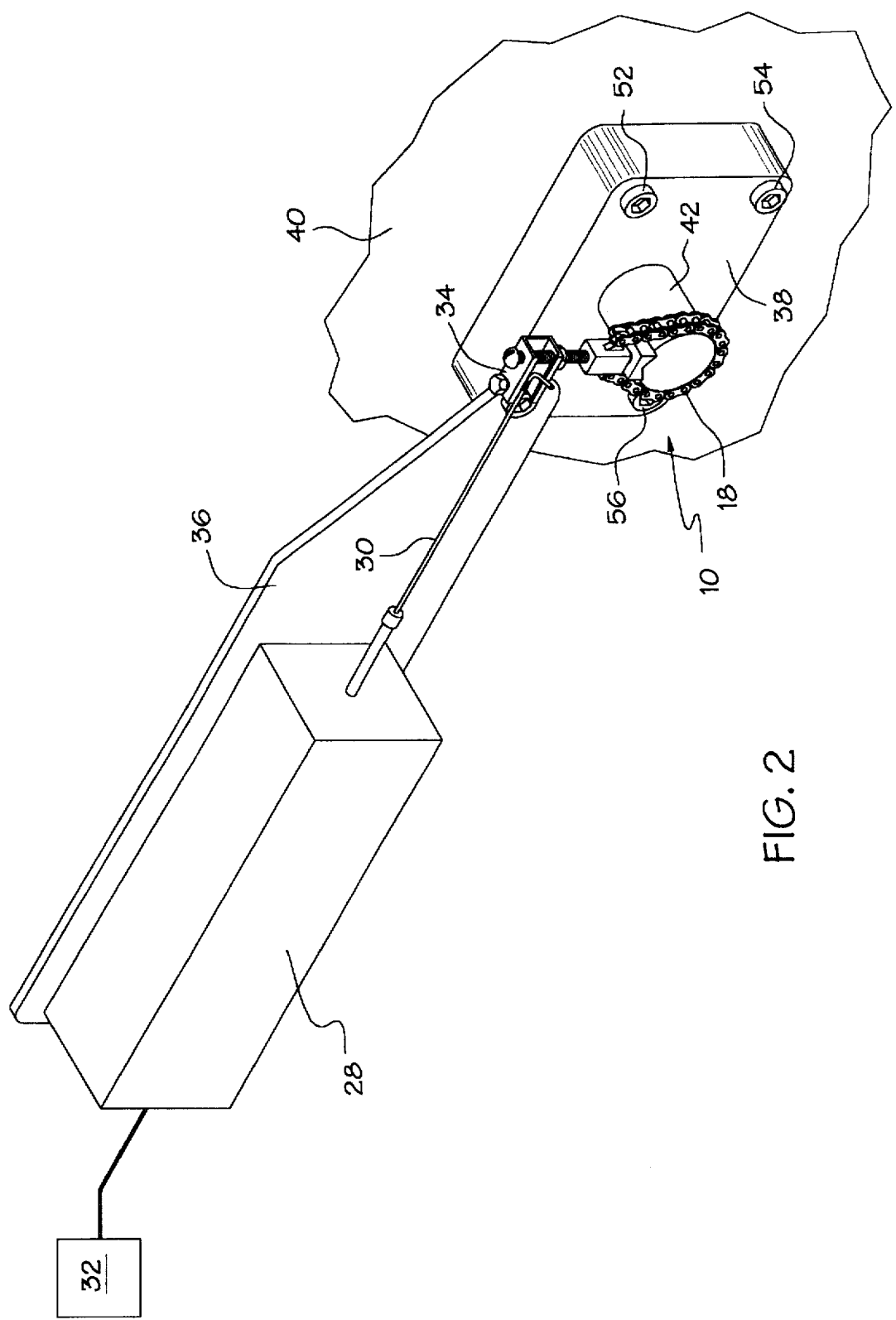
FIG. 2 is the perspective view of the system of FIG. 1 in use.

As shown in FIG. 1, a measuring device generally designated 10 in accordance with the present invention is shaped to receive, in clamping relationship, a valve stem portion of a control valve as shown in FIG. 2. The measuring device 10 includes a threaded shaft 12 including a body 14 which is threadably received on the shaft. At the end of the shaft 12, the device 10 includes a V-shaped end block 16. The V-shaped block has its V-opening facing away from the body 14 so that it receives the valve stem member when in use. The V-shaped end block 16 is rotatably attached to the end of threaded shaft 12 so that when the threaded shaft is rotated, the main body and the V-shaped block are displaced with respect to one another.

The measuring device 10 further includes a flexible link chain 18 fixedly attached to the body 14 at its proximal end 20 by an attachment 22. The distal end 24 of the chain is loose. The chain 18 can be any particular length. However, it should be long enough to reach around the periphery of most commercial sizes and styles of valve stems. A hook 26 is included for attaching the distal end 24 or an intermediate portion of the chain 18. The hook 26 is mounted on the body 14 on the side opposite that in which the proximal end 20 of the chain is joined as can best be seen in FIG. 3. This chain clamp mechanism can clamp to a valve stem member as small as a quarter of an inch in diameter and as large as 6 inches in diameter or larger depending on the length of the chain.

Figure 3:
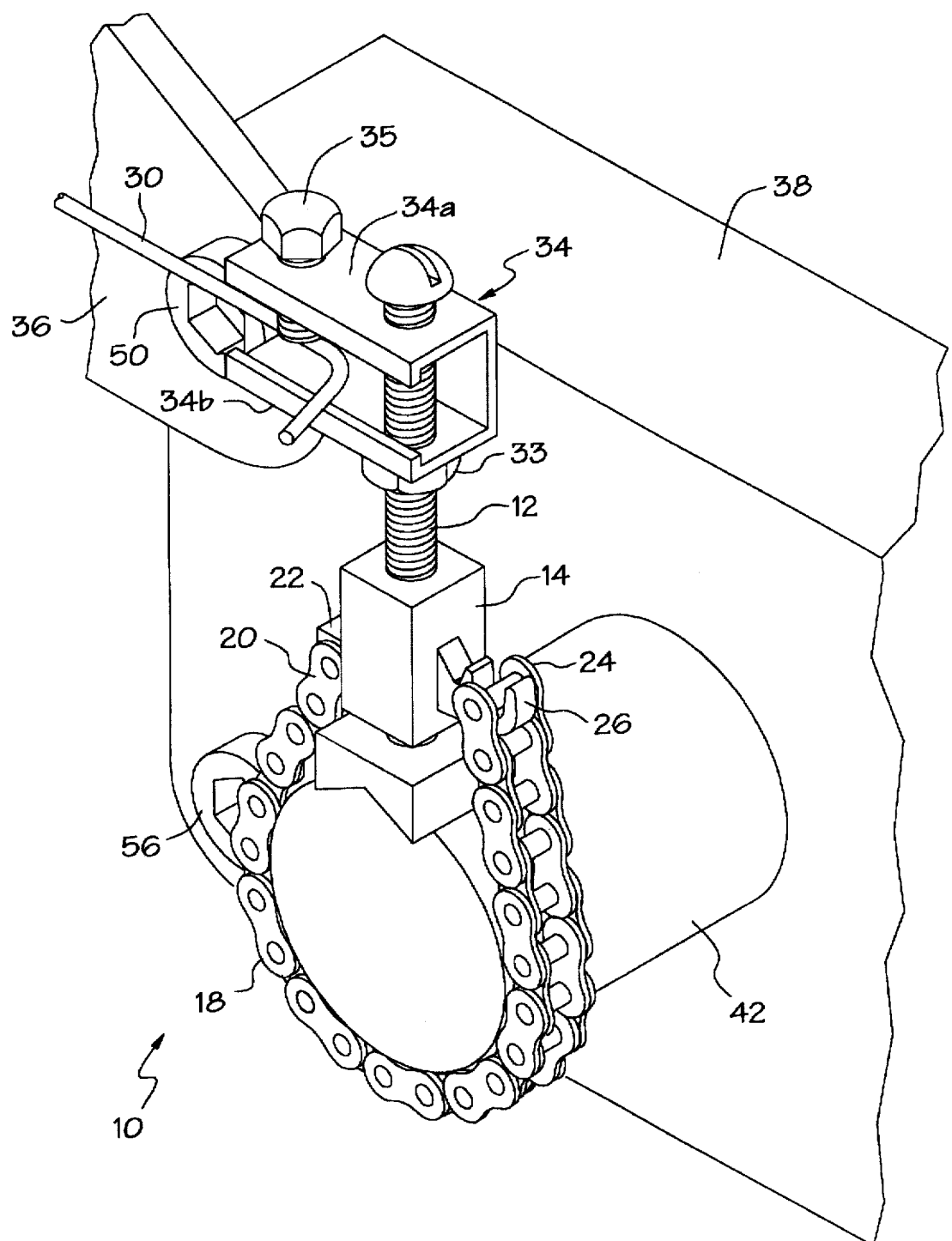
FIG. 3 is a close-up view of the device of FIG. 2 on the valve stem.

The invention further includes a linkage which connects the threaded shaft 12 via a wire cable 30 to a linear detector and transmitter 28. The wire clamp 34 is C-shaped as shown in FIG. 3 and has a through hole in its upper 34a and lower 34b flanges for the threaded shaft 12. There is a further hole in the upper flange for a clamping screw 35, which, when screwed down, securely holds a wire cable 30 in the clamp 34. A nut 33 is loosely placed on the threaded shaft 12 to prevent the clamp from moving along the length of the shaft.

As shown in FIG. 2, the linear detector and transmitter 28 detects the linear movement in the wire cable 30 which is caused by rotation of the valve stem member. The detector then sends a signal to a computer or charting device 32. The transmitter 28 is preferably a linear variable device transmitter ("LVDT") or any type of position sensing device, linear device or linear resistant positioner as would be apparent to those of skill in the art. The LVDT is capable of detecting linear movement in the measurement device 10 produced by rotation of the valve stem 42 in increments of thousandths of an inch or ten thousandths of an inch.

While in use, the transmitter 28 is mounted on a plate 36 which is further mounted to the valve actuator 38. The actuator 38 is attached to the vessel 40 on which the valve is used by four bolts 50,52,54,56.

To mount the measuring device 10 on a valve stem member 42, the user backs out the threaded shaft 12 until the V-shaped end block 16 is adjacent the body 14. The chain 18 is wrapped around the valve stem member 42 and the slack in the chain is taken up until the valve stem member sits in the V-block. The distal end 24 of chain 18 or any intermediate portion is then hooked around the hook 26 on the main block and temporarily held in place by the user's hand. The chain 18 is then tightened around the valve stem member 42 by turning the threaded shaft 12, thereby displacing the body 14 with respect to the V-block 16 until there is no play or slippage between the chain 18 and the valve stem 42. The chain should be placed as close as possible to the valve stem without touching it, so as not to create drag or friction. This eliminates movement which could be produced further from the stem.

To mount the linear detector and transmitter 28 or LVDT, a mounting bolt 50 is removed from the valve actuator 38. The adaptor plate 36 with the LVDT already mounted to it, is mounted to the actuator 38. The bolts 50–56 are tightened down so that the movement of the threaded shaft 12 is parallel to the motion of the LVDT.

Next, the wire cable 30 is connected to the wire clamp 34 and is secured with screw 35. When this is secured, it provides the transfer of motion from the threaded shaft 12 via the wire clamp 34 and cable 30 to the LVDT 28. The LVDT then outputs a signal to the computer or charting device 32 where it can be compared with a signal which controls the actuation of the valve. This completes the hook up on the valve.

It has been shown that the measurement device of the present invention is accurate as well as easy to use. Actual bump tests of input actuator signals verses the measured valve stem movements picked up by the chain clamp measurement device showed the smallest movement corresponding to flow. This was accurately and relatively simply measured using the apparatus and method of the present invention.

Having described the invention in detail and by reference to preferred embodiments thereof, it will be apparent that modifications and variations are possible without departing from the scope of the invention defined in the appended claims.

What is claimed is:

1. A control valve response measurement device for detecting movement of a valve stem member of a control valve comprising:
    a threaded shaft;
    a body threadably received on said threaded shaft;
    an end block attached to an end of said threaded shaft;
    a hook on said body;
    a chain joined at one end to said body and having a length such that said chain is capable of being clamped around a periphery of a valve stem member and attached onto said hook on said body; and
    a linkage to a linear detection device, said linkage being attached to said end of said threaded shaft opposite said end block.

2. The device of claim 1 wherein said end block includes a V-shaped surface facing away from said body.

3. The device of claim 1 further comprising a wire cable for transmitting movement signals from said measurement device to said linear detection device.

4. The device of claim 3 wherein said linkage includes a wire clamp, such that said wire clamp is attached to both said threaded shaft and said wire cable.

5. The device of claim 1 wherein said linear detection device is capable of measuring signals in the range of thousandths or ten thousands of an inch.

6. The device of claim 1 wherein said device is adapted to receive a valve stem member having a diameter in the range of about ¼ to 6 inches.

7. The device of claim 1 wherein said chain has a proximal end fixedly attached to said body and a loose distal end, said hook being adapted to attach to said chain on said distal end or any intermediate portion of said chain.

8. A control valve response measurement device for detecting movement of a valve stem member of a control valve comprising:
    a threaded shaft;
    a wire clamp attached to an end of said threaded shaft;
    a body threadably received on said threaded shaft;
    a V-block having a V-shaped opening shaped to receive a valve stem member, said V-block being attached to an end of said threaded shaft opposite said wire clamp;
    a hook on said body;
    a chain joined at one end to said body and having a length such that said chain is capable of being clamped around a periphery of a valve stem member and hooked to said hook on said main body and a linear detection device, said linear detection device being connected to said wire clamp via a wire cable and wherein said measurement device is capable of detecting slight movement of said valve stem member.

9. A method of measuring movement of an actuator valve comprising the steps of:
    providing a measuring device having a threaded shaft; a body threadably received on said threaded shaft; an end block having a shaped opening and being attached to said end of said threaded shaft; a hook on main body; and a chain;
    providing a valve stem member of a control valve;
    clamping said chain around a periphery of said valve stem member;
    hooking said chain on said hook;

turning said threaded shaft in order to displace said body with respect to said end block and thereby tightening said chain around said valve stem member; and detecting a movement.

10. The method of claim 9 further comprising the steps of:

providing a linkage and a linear detection device, a cable and a wire clamp;

connecting said wire clamp to said threaded shaft; and connecting said cable from said wire clamp to said linear detection device before the step of detecting a movement.

11. The method of claim 10 further comprising the steps of:

providing a computer, wherein a signal representative of valve stem movement is sent from said detection device to said computer; and comparing said signal from the computer with a second signal which controls actuation of said actuator valve.

* * * * *